United States Patent [15] 3,700,701
Dietl et al. [45] Oct. 24, 1972

[54] PREPARATION OF BENZOQUINONES BY OXIDATION OF PARA-SUBSTITUTED PHENOLS

[72] Inventors: Hans K. Dietl; Howard S. Young, both of Kingsport, Tenn.

[73] Assignee: Eastman Kodak Company, Rochester, N.Y.

[22] Filed: June 10, 1971

[21] Appl. No.: 151,904

[52] U.S. Cl.........260/396 R, 260/621 R, 260/623 R, 260/625
[51] Int. Cl..............................................C07c 49/64
[58] Field of Search....................................260/396 R

[56] References Cited

UNITED STATES PATENTS

| | | |
|---|---|---|
| 3,065,155 | 11/1962 | Welsh....................260/396 R |
| 3,213,114 | 10/1965 | Braxton et al...........260/396 R |
| 3,406,188 | 10/1968 | Fletcher.................260/396 R |
| 3,549,669 | 12/1970 | Clemens................260/396 R |
| 3,576,016 | 4/1971 | Finkbeiner.............260/396 R |
| 3,646,073 | 2/1972 | Wollensak.............260/396 R |

*Primary Examiner*—Vivian Garner
*Attorney*—C. D. Quillen, Jr. and Donald W. Spurrell

[57] ABSTRACT

Process for producing substituted benzoquinones through oxidation of para-substituted phenols by manganese dioxide in a mixture of aqueous sulfuric acid and a cosolvent. A typical para-substituted phenol reactant is 2,6-di-tert-butyl-p-cresol, and its oxidation product is 2,6-di-tert-butyl-p-benzoquinone.

5 Claims, No Drawings

PREPARATION OF BENZOQUINONES BY OXIDATION OF PARA-SUBSTITUTED PHENOLS

This invention relates to a process of producing p-benzoquinones. In particular, this invention relates to a process for producing substituted benzoquinones by oxidation of para-substituted phenols with manganese dioxide.

One of the most formidable problems involved in the preparation of benzoquinones is caused by the fact that oxidation routes known in the art lead to extensive by-product formation. Thus, for example, in the prior art methods, the oxidation of 2,6-di-tert-butylphenol leads primarily to 3,3',5,5'-tetra-tert-butyl-diphenoquinone (M. S. Kharasch et al., J. Org. Chem. 22, 1439 (1957). Some of the prior art methods of preparing substituted benzoquinones or hydroquinones are based upon the reaction of alkali metal hydroxides with halophenols at high temperatures. Unfortunately, these processes are not readily applicable to complex phenols and, in particular, are not readily applicable to 2,6-dialkylated phenols because the elevated temperatures required lead to extensive rearrangement and decomposition. Another method of preparing substituted benzoquinones is the decomposition of nitrosophenols to benzoquinones (U.S. Pat. Nos. 3,395,160; 3,415,849; 3,415,850). This process is cumbersome since the nitrosophenols have first to be prepared from the corresponding phenols and then, after isolation, have to be reacted further. There exists, therefore, a need for a process capable of converting complex phenols to substituted benzoquinones in high yields without extensive contamination with decomposition products.

Objects, therefore, of the present invention are to provide an improved method for the preparation of substituted benzoquinones; and, in particular, to provide a process ideally suitable for the preparation of 2,6-di-tert-butyl-p-benzoquinone.

These and other objects hereinafter appearing have been attained in accordance with the present invention through the discovery of the process which comprises treating a para-substituted phenol derivative with manganese dioxide in sulfuric acid as the reaction medium. It is necessary to use a cosolvent with the sulfuric acid, for example, aliphatic organic carboxylic acid of one to 10 carbons, such as acetic or propionic acids or aliphatic ketones of three to 10 carbons such as methyl ethyl ketone. The reaction may be carried out at a temperature from about 0° to about 120° C. with 35° to 90°C. being preferred. The sulfuric acid may have a concentration in water or from about 10 to about 70% by weight with 30 to 50% being preferred. The amount of aqueous sulfuric acid employed, of course, should be such as to form the necessary manganese sulfate in the redox reaction. The preferred ratio of organic acid or ketone to sulfuric acid is in the range of 1:10 to 10:1 by weight.

The manganese dioxide employed in the process may be in any form. Beta-manganese dioxide is preferred and a suitable source is pyrolusite ore. The ratio of manganese dioxide to phenol may be in the range of about 1:10 to 10:1 on a weight basis. Even higher ratios may be used, since it is possible, for example, to extract the quinone from unconsumed oxidant. Suitable phenols are any para-substituted phenols, which have at least another group in ortho position. These include 2,4,6-tri-tert-butyl-phenol; 2,4,6-trimethylphenol; 2,6-di-tert-butyl-p-cresol; and 2,4,6-trichlorophenol. Such phenols may be represented by the general formula

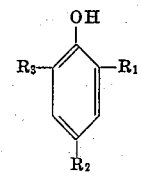

wherein $R_1$, $R_2$ and $R_3$ may be the same or different alkyl groups of one to eight carbons, or halogen, and $R_2$ may be a $-COOR_4$ group wherein $R_4$ is hydrogen or alkyl of one to 12 carbons. Para-cresol itself gives only an uneconomically small yield of benzoquinone, probably because p-benzoquinone itself is not stable in the reaction system.

The following examples further illustrate the invention:

EXAMPLE 1

A quantity of 20 g. 2,6-di-tert-butyl-p-cresol is added to a mixture containing 150 g. 40% aqueous sulfuric acid and 75 g. glacial acetic acid. The mixture is heated to 60° C. under stirring and 40 g. finely powdered beta-manganese dioxide (pyrolusite) is added under stirring over a period of 2 hrs. at 60° C. After the addition of manganese dioxide is completed, stirring is continued for another 3 hrs. at 60° C. Then, after cooling to room temperature, the reaction mixture is diluted with 600 ml. water and steam distilled. The distillate is extracted with ether, and the ether is allowed to evaporate to give 15 g. (75% yield) of 2,6-di-tert-butyl-p-benzoquinone.

EXAMPLE 2

This example shows that para substitution is necessary to give good yield of benzoquinone. A quantity of 20 g. of 2,6-di-tert-butylphenol is added to a mixture containing to 150 g. 40% sulfuric acid in water and 75 g. glacial acetic acid. The mixture is treated exactly as described in Example 1. Only 2.1 g. of 2,6-di-tert-butyl-p-benzoquinone (10% yield) is obtained.

EXAMPLE 3

This example shows that in comparison with Example 1, omission of acetic acid as cosolvent results in lower yields and longer reaction times. A quantity of 20 g. 2,6-di-tert-butyl-p-cresol in 200 g. 40% sulfuric acid is oxidized with 40 g. beta-manganese dioxide for 8 hrs. at 60° C. By steam distillation, 3 g. 2,6-di-tert-butyl-p-benzoquinone is obtained. Some starting phenol (1 g.) is recovered.

EXAMPLE 4

This example oxidizes a phenol with a methyl substitution in the ortho position. A quantity of 20 g. 2,4,6-trimethylphenol is oxidized with 20 g. beta-manganese dioxide in 150 g. 40% sulfuric acid and 75 g. glacial acetic acid for 4 hrs. at 50° C. By steam distillation, 5 g. of 2,6-dimethyl-p-benzoquinone is obtained.

EXAMPLE 5

This example oxidizes a phenol with a tertiary butyl group in the para position. A quantity of 20 g. 2,4,6-tri-tert-butylphenol is oxidized with 40 g. manganese dioxide in 40% sulfuric acid containing acetic acid at 60° C. for 18 hrs. Steam distillation of the diluted reaction mixture gives a 70% yield of 2,6-di-tert-butyl-p-benzoquinone calculated on converted starting material.

EXAMPLE 6

This example demonstrates the use of propionic acid as solvent and of oxidizing a phenol with a halogen in para position. A quantity of 20 g. 4-chloro-2,6-di-tert-butylphenol is oxidized with 40 g. beta-manganese dioxide in 150 g. 40% aqueous sulfuric acid and 75 g. propionic acid for 10 hrs. at 45° C. By steam distillation a 50% yield of 2,6-di-tert-butyl-p-benzoquinone and a 25% yield of 2,6-di-tert-butyl-3-chloro-p-benzoquinone is obtained.

EXAMPLE 7

This example demonstrates the use of manganese dioxide other than the beta form and the possibility of oxidizing a phenol with a phenyl group in para position. A quantity of 20 g. 4-phenyl-2,6-di-tert-butylphenol is oxidized with gamma-manganese dioxide in 40% aqueous sulfuric acid containing acetic acid, at 70° C. for 5 hrs. By steam distillation a 60% yield of 2,6-di-tert-butyl-p-benzoquinone is obtained.

EXAMPLE 8

Oxidation of 2,6-Di-tert-butyl-p-cresol Using Methyl Ethyl Ketone as Cosolvent

A quantity of 20 g. of 2,6-di-tert-butyl-p-cresol is added to a mixture containing 150 g. of 40% aqueous sulfuric acid and 75 g. of methyl ethyl ketone. The mixture is heated to 65° C. with stirring and 40 g. of finely powdered beta-manganese dioxide (pyrolusite) is added over a period of 2 hr. at 60° C. After the addition of manganese dioxide is completed, stirring is continued for another 4 hr. at 65° C. Then, after cooling to room temperature, the reaction mixture is diluted with 600 ml. water and steam distilled. The distillate is extracted with ether and the ether is allowed to evaporate to give 18.3 g. of a mixture of 2,6-di-tert-butyl-p-benzoquinone and 2,6-di-tert-butyl-p-cresol. The two components are separated by column chromatography ($Al_2O_3$, hexane as eluant) to give 9.6 g. of 2,6-di-tert-butyl-p-benzoquinone (85% yield on converted starting material) and 8.7 g. of recovered starting material.

EXAMPLE 9

Oxidation of 3,5-Di-tert-butyl-4-hydroxybenzoic Acid (Carboxylic group in para position)

A quantity of 20 g. of 3,5-di-tert-butyl-4-hydroxybenzoic acid is added to a mixture containing 150 g. of 40% aqueous sulfuric acid and 75 g. of glacial acetic acid. The mixture is heated to 65° C. with stirring and 40 g. of finely powdered beta-manganese dioxide is added over a period of 2 hr. at 60° C. After the addition of manganese dioxide is completed, stirring is continued for another 5 hr. at 65° C. Then, after cooling to room temperature, the reaction mixture is diluted with 600 ml. water and steam distilled. The distillate is extracted with ether, and the ether allowed to evaporate to give 8.6 g. (55% yield) of 2,6-di-tert-butyl-p-benzoquinone. Unreacted starting material is left in the distillation pot in the steam distillation.

EXAMPLE 10

Oxidation of 2,4,6-Trichlorophenol (Chlorine in the ortho and para positions)

A quantity of 20 g. of 2,4,6-trichlorophenol is added to a mixture containing 150 g. of sulfuric acid in water and 75 g. of glacial acetic acid. The mixture is treated as described in the examples above. A 60% yield of a mixture of trichloro-p-benzoquinone (about 3 parts) and 2,6-dichloro-p-benzoquinone (about 1 part) is obtained.

The benzoquinones produced by this process and the hydroquinones that can be produced from them are reactive chemical intermediates and have the many uses known for these types of compounds. The benzoquinones for example are easily reduced to hydroquinones and can, therefore, function in organic reactions as oxidizing agents. The hydroquinones, which can easily be obtained from the benzoquinones by known methods are useful as antioxidants, or can be converted to antioxidants.

The invention has been described in considerable detail with particular reference to preferred embodiments thereof, but it will be understood that variations and modifications can be effected within the spirit and scope of the invention as described hereinabove.

We claim:

1. The process comprising treating a para-substituted phenol of the formula

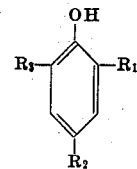

wherein $R_1$, $R_2$ and $R_3$ may be the same or different alkyl groups of one to eight carbons, or halogen, and $R_2$ may be a —$COOR_4$ group wherein $R_4$ is hydrogen or alkyl group of one to 12 carbons, with manganese dioxide in an aqueous, 10 to 70% by weight, sulfuric acid-organic solvent reaction medium at from about 0° to about 120° C. for a sufficient time to produce the corresponding substituted benzoquinone of the formula

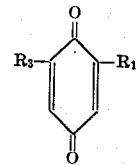

wherein $R_1$ and $R_3$ are as defined above, said organic solvent being selected from alkanoic acids of one to 10 carbons, and aliphatic hydrocarbon ketones of three to 10 carbons.

2. The process of claim 1 wherein the reaction temperature is from 35° to 90° C.

3. The process of claim 1 wherein the cosolvent is acetic acid or methyl ethyl ketone in a weight ratio to the sulfuric acid of 1:10 to 10:1.

4. The process of claim 1 wherein the para-substituted phenol is 2,6-di-tert-butyl-p-cresol.

5. The process of claim 1 wherein the para-substituted phenol is 2,4,6-tri-tert-butylphenol.

* * * * *